(12) United States Patent
Reitmeier

(10) Patent No.: US 7,068,145 B2
(45) Date of Patent: Jun. 27, 2006

(54) METHOD AND DEVICE FOR CONTROLLING HOUSEHOLD APPLIANCES

(75) Inventor: Willibald Reitmeier, Hemau (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 126 days.

(21) Appl. No.: 10/629,947

(22) Filed: Jul. 30, 2003

(65) Prior Publication Data

US 2004/0160335 A1    Aug. 19, 2004

Related U.S. Application Data

(63) Continuation of application No. PCT/EP02/00968, filed on Jan. 30, 2002.

(30) Foreign Application Priority Data

Jan. 30, 2001    (DE) ............................... 101 03 948

(51) Int. Cl.
    *G06F 7/04* (2006.01)
    *G06K 9/00* (2006.01)

(52) U.S. Cl. .................... 340/5.53; 340/5.83; 382/124; 713/186

(58) Field of Classification Search ............. 340/5.53, 340/5.52, 5.8, 5.82, 5.83, 3.1, 5.72; 381/124; 713/186, 202; 126/273.5; 219/391
See application file for complete search history.

(56) References Cited

U.S. PATENT DOCUMENTS

| 5,559,504 A | 9/1996 | Itsumi et al. |
| 6,100,811 A | 8/2000 | Hsu et al. |
| 6,225,890 B1* | 5/2001 | Murphy ..................... 340/5.1 |
| 6,271,745 B1* | 8/2001 | Anzai et al. ............... 340/5.53 |
| 6,628,810 B1* | 9/2003 | Harkin ....................... 382/116 |
| 6,792,287 B1* | 9/2004 | Huuskonen et al. ....... 340/5.83 |
| 2002/0133716 A1* | 9/2002 | Harif .......................... 713/201 |

FOREIGN PATENT DOCUMENTS

| DE | 197 10 546 A1 | 9/1998 |
| DE | 198 58 310 A1 | 6/2000 |
| DE | 199 03 919 A1 | 8/2000 |
| EP | 0 776 132 A2 | 5/1997 |
| EP | 0 910 215 A2 | 4/1999 |
| EP | 0 924 123 A2 | 6/1999 |
| EP | 0 949 578 A2 | 10/1999 |

(Continued)

OTHER PUBLICATIONS

Jean-François Mainguet (2004). List of fingerprint sensors/sensing area/JFM 2004. Retrieved Apr. 26, 2005 from http://www.perso.wanadoo.fr/fingerchip/biometrics/types/fingerprint_sensors_list.htm.*

(Continued)

*Primary Examiner*—Brian Zimmerman
*Assistant Examiner*—Clara Yang
(74) *Attorney, Agent, or Firm*—Laurence A. Greenberg; Werner H. Stemer; Ralph E. Locher

(57) ABSTRACT

A method, a device, and a control system for inputting control information into an appliance, whereby a biometric recognition of a respective user is performed with the aid of a fingerprint. For purposes the method, the corresponding device, and the control system, a user is assigned to one of several user and/or authorization levels by the biometric recognition. A predetermined minimum range of functions and/or range of setting options of the appliance are enabled upon the occurrence of a biometric recognition failure occurs and/or operation by an unknown user.

25 Claims, 2 Drawing Sheets

FOREIGN PATENT DOCUMENTS

| | | |
|---|---|---|
| FR | 2 683 334 A1 | 5/1993 |
| WO | 97/11448 | 3/1997 |
| WO | 98/12670 | 3/1998 |
| WO | 00/46756 | 8/2000 |

OTHER PUBLICATIONS

Veridicom, FPS200 Fingerprint Sensor, 2005.*

* cited by examiner

METHOD AND DEVICE FOR CONTROLLING HOUSEHOLD APPLIANCES

CROSS-REFERENCE TO RELATED APPLICATION

This application is a continuation of copending International Application No. PCT/EP02/00968, filed Jan. 30, 2002, which designated the United States and was not published in English.

BACKGROUND OF THE INVENTION

Field of the Invention

The invention relates to a method for inputting control information into an appliance—whereby a biometric recognition of a respective user is performed, specifically, with the aid of a fingerprint—a corresponding device, and a control system.

The utilization of devices for biometric recognition in the field of household appliances is known from International publication WO 00/46756 A1, for example. In this publication, a re-recognition of a fingerprint effectuates an activation of an appliance. The fingerprint can be linked in the appliance with a specific selection of a program.

SUMMARY OF THE INVENTION

It is accordingly an object of the invention to provide a method and device for controlling household appliances that overcomes the hereinafore-mentioned disadvantages of the heretofore-known devices and methods of this general type and that further develops the method, a corresponding device, and a control system.

With the foregoing and other objects in view, there is provided, in accordance with the invention, a method for inputting control information into a household appliance, including the steps of performing a biometric fingerprint recognition of a respective user with a biometric fingerprint recognition device of a household appliance, assigning the user to one of several authorization levels based on the biometric fingerprint recognition, and enabling at least one of a predetermined minimum range of functions and a predetermined minimum range of setting options of the appliance when at least one of a biometric recognition failure occurs and operation by an unknown user occurs.

An inventive method for controlling a household appliance provides that a user is associated with one or more user and/or authorization levels by the biometric recognition. This opens up new areas of utility or new applications for biometric recognition beyond only two possibilities. In the specific area of appliances, the possibilities of "user recognized" and "user not recognized" could only be associated with the actions "access granted" and "access denied". It is possible to distinguish between an administrator with global authorization and subordinate normal users that way. Appliances that are equipped according to an inventive method are provided with a wide array of options for inputting control information based on defined characteristics of several user and/or authorization levels, which options will be separately discussed in connection with developments, various embodiments, and an exemplifying embodiment of the invention. Advantageously, selected settings of a user cannot be changed by any other user of the same appliance. In an embodiment of the invention, only a user who is higher in a hierarchy, such as a co-worker of a technician or someone who is otherwise furnished with maintenance authority, such as an administrator, is authorized to make modifications. A predetermined minimum range of functions and/or setting capabilities is enabled given a failure of the biometric recognition and/or an operation by an unknown user. In a preferred embodiment, functions such as emergency shutdown can be executed by any user, including a non-registered user. This capability is not possible in methods according to the prior art based on upstream recognition as the authorizing process.

In accordance with another mode of the invention, the user is assigned to one of several user levels based upon the biometric recognition of the user.

In accordance with a further mode of the invention, an item of individual supplementary information is stored for each user. That way, specific preferences, particularly, in the setting of parameters within given programs, can be detected for each user after a short usage period and, subsequently, suggested by the appliance as start values or standard values for the respective user given re-polling.

In accordance with an added mode of the invention, each authorization level is, advantageously, assigned an item of supplementary information. This supplementary information can be developed from a variety of information items from different individual users in a learning process. In addition, short commands can be defined as abbreviations within a multi-layer or multi-stage selection menu to make possible a timesaving user-based setting of wanted functions. In a specific development of the invention in a kitchen, for example, a stove can be configured to recognize children, such that, upon recognition of a fingerprint, only a limited range of functions are available to the children as users. In particular, the reheating of prepared food up to approx. 50–60° C. is possible, whereby higher temperatures or any utilization of the baking area or the broiler are precluded. The burn risk is, thus, substantially reduced. For a child, a separate access to the appliance for independent activity is granted with defined authorization, which can aid supervision. On the other hand, the stove cannot be damaged by a setting entered by a child. This improves safety in the home appreciably while promoting a child's exploration of the environment and independent learning.

In accordance with an additional mode of the invention, supplementary information in the form of individual settings is activated dependent upon recognition of the user's fingerprint.

In accordance with yet another mode of the invention, the supplementary information is activated by the fingerprint as a deviation from defaults for functions in different authorization levels.

In accordance with yet a further mode of the invention, children are granted at least one of minimal user authorization and minimal setting authorization upon biometric recognition of a respective child's fingerprint.

In accordance with yet an added mode of the invention, a light is provided with the appliance and children are authorized to turn on the light as the minimal user authorization.

In accordance with yet an additional, mode of the invention, a stove is provided as the appliance and children are authorized to at least one of turn on the light of the stove and to activate a temperature of the stove suitable for reheating prepared foods as the minimal user authorization, in particular, a temperature between approximately 50° and 60° C.

In accordance with again another mode of the invention, the appliance is protected against unintentional changes once an authorized user completes at least one of a setting and a programming of the appliance.

In accordance with again a further mode of the invention, changes of the appliance are authorized only after a new subsequent identification of an authorized user occurs.

In accordance with again an added mode of the invention, a childproofing function of the appliance is activated by placement of a predetermined finger of an authorized user, and, preferably, by not running through appliance menus.

In accordance with again an additional mode of the invention, the childproofing function is deactivated by reapplication of the predetermined finger of the authorized user, and, preferably, by not running through appliance menus.

In accordance with still another mode of the invention, the biometric recognition is performed by capacitive measurement of the fingerprint, particularly, by a semiconductor array, for instance, in the form of a silicon chip. Alternatively, the recognition can be performed by the optical scanning of the finger, for instance, by a charge-coupled device (CCD) chip or row sensor. These variants of recognition systems are provided with different modes in which, for example, a new user can be defined and "learned," that is to say, read, and so on.

In accordance with still a further mode of the invention, an inventive method is executed at a location in a networked household. That way, control information can be centrally entered, and/or a variety of devices or appliances can be centrally controlled and/or monitored. Characteristics of various devices can be provided only once and, then, utilized jointly. In addition, the number of redundant subsystems within a household can be substantially reduced by this measure.

In accordance with still an added mode of the invention, cost data and usage and/or consumption information are, advantageously, stored and/or edited, preferably, in a central device, particularly, in the user memory, this being a multidimensional memory. This feature of precise usage-based accounting is highly advantageous particularly for appliances that are accessed by several different users. For example, in multi-family dwellings or larger rental units, a washing machine can, now, be used by all tenants without keeping tallies. In another embodiment, during or after recognition of a user, these cost data or usage and/or consumption information can be outputted as information in optical, acoustical, and/or some other form at another device, namely over a local network. In an embodiment of the invention, an external service provider by way of an interface at the appliance, a local network, or a data line reads the user memory; it is edited; and/or the data are otherwise processed.

With the objects of the invention in view, in a household appliance, there is also provided a device for entering control information, including a biometric recognition device for reading a respective user's fingerprint and supplying an output signal, an at least partly electronic control connected to the biometric recognition device, the control receiving the output signal and having a processor programmed to recognize the respective user based upon the output signal, a user memory connected to the control and to the biometric recognition device, the user memory having a hierarchical structure assigning a respective user to one of several authorization levels, and the processor is programmed to enable at least one of a predetermined minimum range of functions and a predetermined minimum range of setting options given at least one of a failure of a biometric recognition and an operation by an unknown user.

The fingerprint module can, optionally, be installed in the operating unit of the stove on the front side, for instance, in the glass ceramic field of the cooktop or in the door handle of the oven. In a separate operating module, which is mobile according to one development, whole groups of appliances in a kitchen or a common household are driven and/or controlled by the fingerprint module in integrated fashion. The latter two variants presuppose a network for connecting a device to the individual components inside the kitchen or the overall household.

In accordance with still an additional feature of the invention, the user memory has a hierarchical structure assigning a respective user to one of several user levels.

In accordance with another feature of the invention, the user memory has a hierarchical structure with user levels, and the processor is programmed to assign a respective user to one of the user levels.

In accordance with a further feature of the invention, the user memory stores individual supplementary information for each user.

In accordance with an added feature of the invention, the processor is programmed to transmit control information to at least one of other devices and other appliances.

In accordance with a concomitant feature of the invention, the processor is to be connected to a local network.

The inventive method and corresponding device create new possibilities for the secure, rapid, and loggable entry of control information. The scope of the control information can be adjusted as described above, whereby appliances can also be connected to a service provider over a local network and/or a data connection so that additional characteristics can be available. The inventive method, thus, discloses a new business opportunity for the manufacturer of inventive appliances. The manufacturer assumes the role of a continuously available service intermediary or network provider and provider of various services that, on their part, can also be acquired centrally at the service provider, depending on the embodiment. This service can also be provided by the manufacturer as the service provider, as can the services described above. A request for such services can be configured to require payment. Usage is, advantageously, at the option of the appliance operator as the consumer. The required information is processed in the form of electronic data so that the storage management and file management for the information dwindles to the size of modern flexible electronic mass storage media and correspondingly powerful computers, even though the service of a central accounting unit is being provided.

Other features that are considered as characteristic for the invention are set forth in the appended claims.

Although the invention is illustrated and described herein as embodied in a method and device for controlling household appliances, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
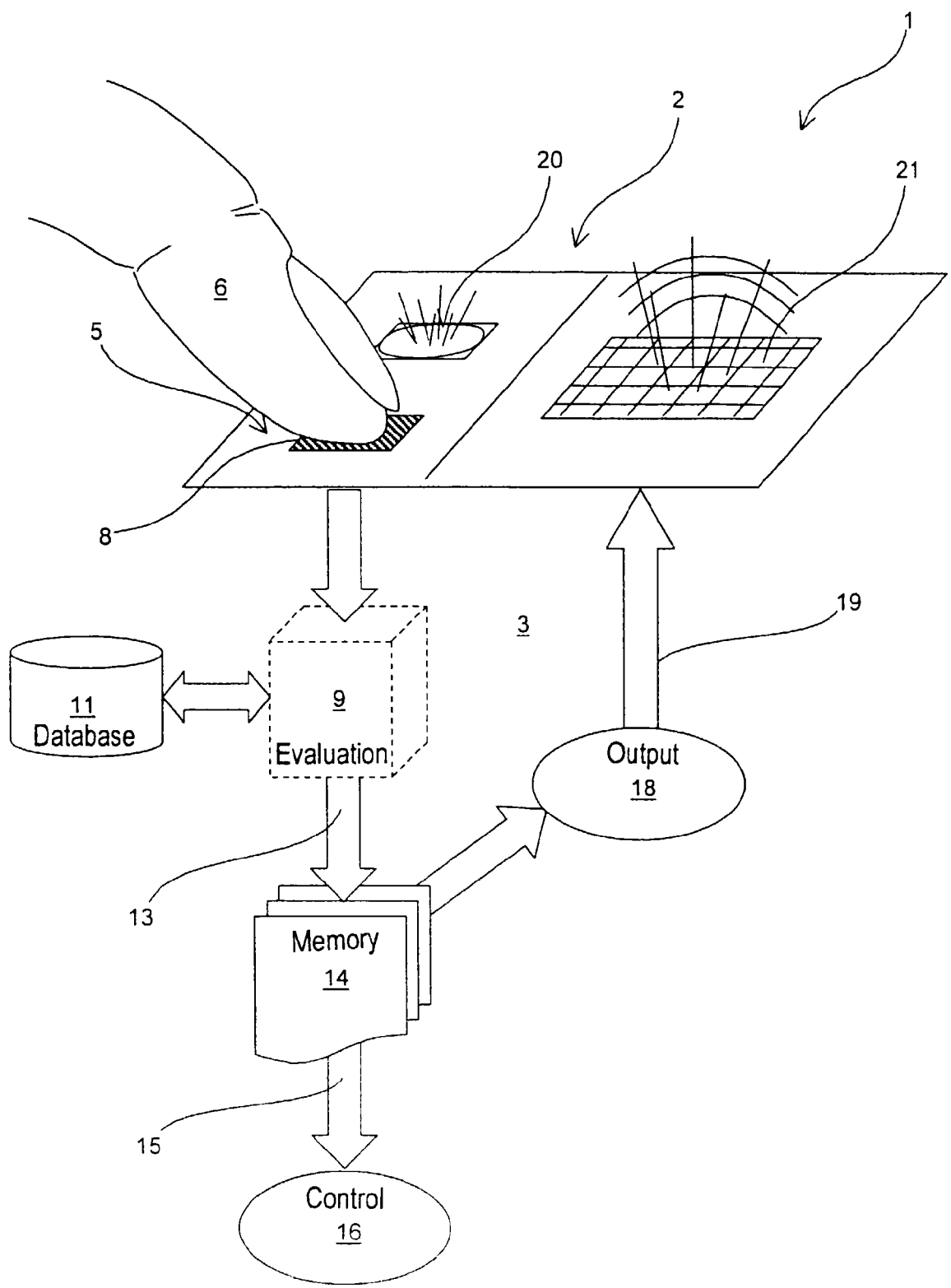
FIG. 1 is a fragmentary diagrammatic and block circuit diagram of a device according to the invention.

Referring now to the figures of the drawings in detail and first, particularly to FIG. 1 thereof, there is shown a first embodiment of the inventive device 1 integrated in a display and control aperture 2 of a household appliance 3. In the representation of FIG. 1, the display and control aperture 2 is represented only sectionally to show the configuration and integration of a device for biometric recognition in the form of a fingerprint module 5. Simply by placing a finger 6 down, a user triggers in the device 1 the process described below for inputting control information for the appliance 3.

The fingerprint module 5 includes a silicon chip 8 for the capacitive measuring of a profile of the finger 6, i.e., the fingertip. A registered pattern is sent by the silicon chip 8 to an evaluation unit 9, in which a comparison of the registered pattern to patterns from a database or archive 11 is performed. The result of this comparison is forwarded as information 13 to a multi-dimensional memory 14 for purposes of locating personal data within a predetermined authorization hierarchy. If a user is recognized by the fingerprint module 5 and the archive 11 from the print of his finger 6, a function 15 or specific range of selected functions is made available as control information within a user and/or authorization level that is assigned to the user. Otherwise, an emergency shutdown function is made available as function 15 and forwarded to a central control 16 of the appliance so that even a user who is not located in the archive 11 can effect an immediate shutdown of the appliance 3 in case of danger.

With the aid of plain text displays or high-resolution graphic display equipment, neither of which is represented in the figures, such information can be conditioned in simple fashion as described in the prior art by a conditioning and output unit 18, and individually displayed by drive signals 19, there being a separate optical display 20, acoustical output device 21, or devices for sending tactile acknowledgment to the user provided in the display and control aperture 2.

Figure 2:
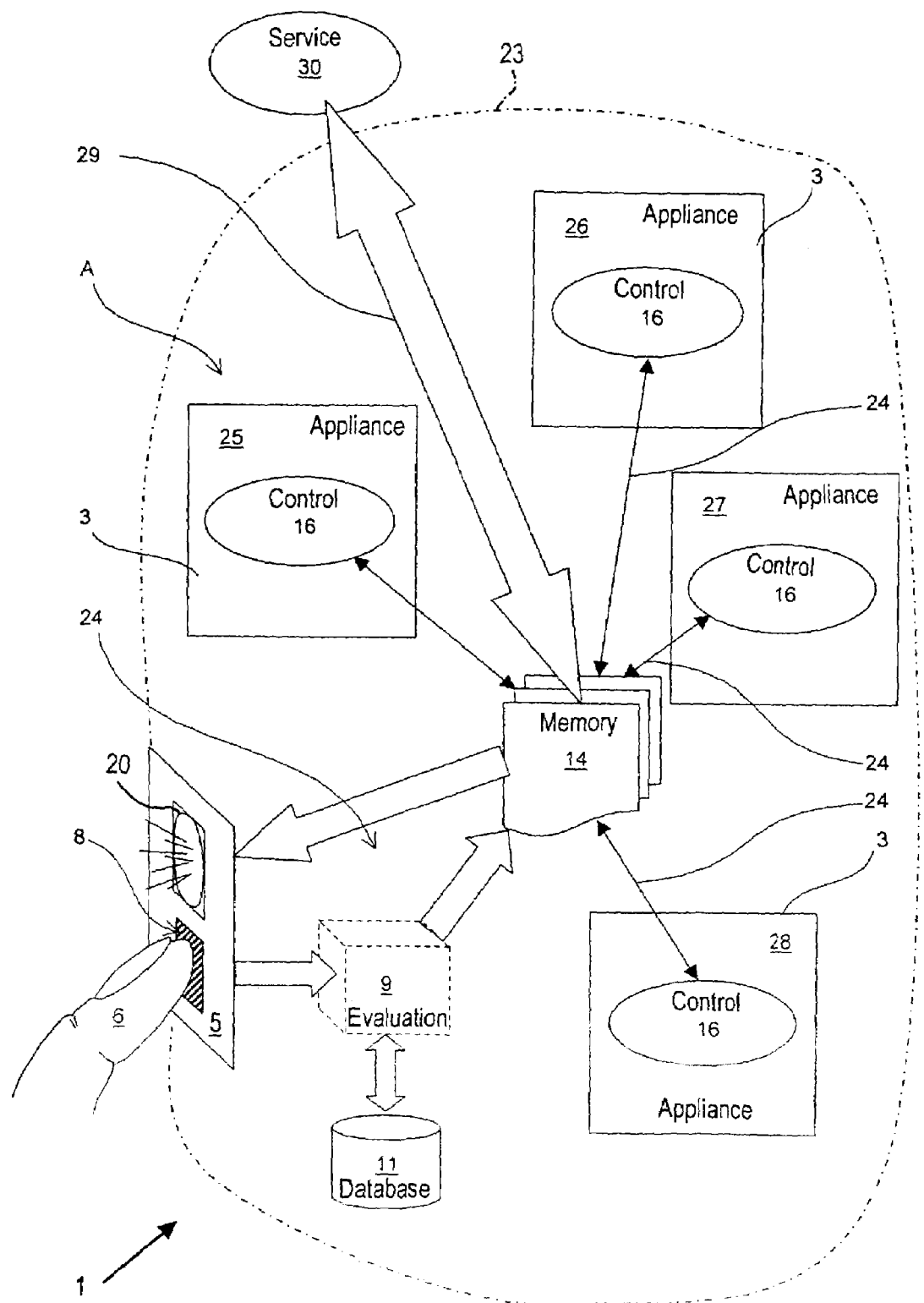
FIG. 2 is a fragmentary diagrammatic and block circuit diagram of an inventive system of networked appliances according to the invention.

In the second exemplifying embodiment of FIG. 2, the inventive device 1 is integrated in a local network 23 and connected to the central controls 16 of various appliances 3 at a location A over wirebound or wireless data connections 24. Interfaces of the Blue Tooth Standard, which is expanded by wirebound data connections 24, are employed in the represented household for setting up wireless data connections 24. The multidimensional memory 14 with personal data in the authorization hierarchy serves as a node in a star network structure in which the evaluation unit 9 and the archive 11 can also be integrated in centralized form for utilization by several devices 3.

Examples of ordinary household appliances 3 herein represented include: a washing machine 25, a stove 26, a dishwasher 27, and a coffee and espresso machine 28. The silicon chip 8 of the fingerprint module 5 is configured as access control at the entrance of the represented household, this serving in place of a house key. The recognition of a user triggers a variety of actions: the optical display 20 signals the opening of a door; or the coffee and espresso machine 28, depending on the time of day, receives the command for a specified program with person-linked parameter deviations relating to the amount of coffee to be used and the amount of coffee to be made. With the constant expansion of user-related information in the user memory 14, personal user profiles are created so that usage habits of a particular user in the household can be, unambiguously, associated with the local home network 23. On that basis, each of the devices 3 can make individualized usage suggestions to the user, i.e., the stove 26 suggests to a user who likes to eat grilled food that, near the end of the cooking time of a pork roast, he should broil it and/or take other measures to make the food crispy.

The local network 23 of the service user, i.e., the operator of the appliance 3 at location A as client of the device 1, is connected to an external service provider 30 over a separate data line 29. The data line 29 is part of a global network 4, for example, a mobile radio network or the Internet, so that the control system 1 is configured highly flexibly for sending and receiving control information. Such information can also be commercial in nature so that, in the above example, the stove 26 can make the user aware of a new grilling sauce or can simply advise the user to baste the crust of a roast with beer, and so on.

The device 1 according to FIG. 2 can, of course, also be implemented and networked multiple times in one household, creating the ability to locate individuals within a large complex. In one room, for example a kitchen or other hazardous place, differentiated usage authorizations can be given. This is relevant to various forms of child safety mechanisms. A child can be denied access, generally speaking, but the system knows if an adult who can supervise the child is already in the room. Heretofore, a stove 26 was protected against mis-operation by children by positioning the switches at an almost unreachable height. But a device 1 is a substantially better match for the resourcefulness and curiosity of children. Now, a child can grab and feel almost everything. But the command to open the oven will not be executed due to a lack of authorization, and the burners will heat only to hand temperature. Thus, the risk of burns and other injuries is reduced substantially compared to prior art measures. Sensors in the form of silicon chips 8 with a protective cover against contamination are attached where every user has to reach with his finger 6 anyway, i.e., in operating and display apertures 2 or handles or the like. Mis-operations during wiping or inadvertent touching can be substantially prevented by reasonableness queries. Furthermore, once a setting and/or programming is/are completed by an authorized user, it is protected against unintentional modification. Children, too, are, then, unable to make changes.

Changes can be made only subsequent to a new identification of an authorized user. All kinds of child safety measures are activated by placement of a predetermined finger of an authorized user and deactivated by a second placement, without having to run through extensive menus. This does not apply to emergency shutdowns.

In an embodiment of the invention that is not illustrated, device 1 is utilized as an access control and for setting a pre-selection for a television. The functionality of the classic television is being expanded increasingly by Internet accesses or various pay-per-view film offers as well as the ability to place direct orders in virtual shopping malls; therefore, access control and user identification will become necessary for reasons of accounting and child welfare. The fingerprint module 5 is, advantageously, integrated in a remote control or some other operating device such as a cordless keyboard. Thus, the user must automatically identify himself by his fingerprint when switching on the device by a button or sensor key. Pre-selections of various television programs, news channels, film requests, and so on, are, then, stored in the archive 11 for each person according to his authorizations. Building on such a user profile, an individualized program preview can be faded in as a greeting according to the user default, which far surpasses the capabilities of the classic printed programming guide.

I claim:

1. A method for inputting control information into a household appliance, which comprises:
performing a biometric fingerprint recognition of a respective user with a biometric fingerprint recognition device of a household appliance;
assigning the user to one of several authorization levels based on the biometric fingerprint recognition;
enabling at least one of a predetermined minimum range of functions and a predetermined minimum range of setting options of the appliance when at least one of a biometric recognition failure occurs and operation by an unknown user occurs;
granting children at least one of minimal user authorization and minimal setting authorization upon biometric recognition of a respective child's fingerprint;
providing a light with the appliance; and
authorizing children to turn on the light as the minimal user authorization.

2. The method according to claim 1, which further comprises storing an item of individual supplementary information in the appliance for each user.

3. The method according to claim 1, which further comprises assigning an item of supplementary information to each authorization level.

4. The method according to claim 1, which further comprises activating supplementary information in the form of individual settings dependent upon a recognition of the user's fingerprint.

5. The method according to claim 4, which further comprises activating supplementary information by the fingerprint as a deviation from defaults for functions in different authorization levels.

6. The method according to claim 1, which further comprises protecting the appliance against unintentional changes once an authorized user completes at least one of a setting and a programming of the appliance.

7. The method according to claim 1, which further comprises authorizing changes of the appliance only after a new subsequent identification of an authorized user occurs.

8. The method according to claim 1, which further comprises activating a childproofing function of the appliance by placement of a predetermined finger of an authorized user.

9. The method according to claim 8, which further comprises deactivating the childproofing function by reapplication of the predetermined finger of the authorized user.

10. The method according to 1, which further comprises performing the biometric recognition with a capacitive measurement of the fingerprint.

11. The method according to claim 10, which further comprises performing the capacitive measurement of the fingerprint with a semiconductor array.

12. The method according to claim 10, which further comprises performing the capacitive measurement of the fingerprint with a silicon chip.

13. The method according to claim 1, which further comprises performing the biometric recognition by optically scanning the user's finger.

14. The method according to claim 13, which further comprises performing the optical scanning with one of a charge-coupled device (CCD) chip or a row sensor.

15. A method for inputting control information into a household appliance, which comprises:
performing a biometric fingerprint recognition of a respective user with a biometric fingerprint recognition device of a household appliance;
assigning the user to one of several authorization levels based on the biometric fingerprint recognition;
enabling at least one of a predetermined minimum range of functions and a predetermined minimum range of setting options of the appliance when at least one of a biometric recognition failure occurs and operation by an unknown user occurs;
granting children at least one of minimal user authorization and minimal setting authorization upon biometric recognition of a respective child's fingerprint;
providing a stove as the appliance; and
authorizing children to at least one of turn on the light of the stove and to activate a temperature of the stove suitable for reheating prepared foods as the minimal user authorization.

16. A method for inputting control information into a household appliance, which comprises:
performing a biometric fingerprint recognition of a respective user with a biometric fingerprint recognition device of a household appliance;
assigning the user to one of several authorization levels based on the biometric fingerprint recognition;
enabling at least one of a predetermined minimum range of functions and a predetermined minimum range of setting options of the appliance when at least one of a biometric recognition failure occurs and operation by an unknown user occurs;
granting children at least one of minimal user authorization and minimal setting authorization upon biometric recognition of a respective child's fingerprint;
providing a stove as the appliance; and
authorizing children to at least one of turn on the light of the stove and to activate a temperature of the stove between approximately 50° and 60° C. as the minimal user authorization.

17. A method for inputting control information into a household appliance, which comprises:
performing a biometric fingerprint recognition of a respective user with a biometric fingerprint recognition device of a household appliance;
assigning the user to one of several authorization levels based on the biometric fingerprint recognition;
enabling at least one of a predetermined minimum range of functions and a predetermined minimum range of setting options of the appliance when at least one of a biometric recognition failure occurs and operation by an unknown user occurs; and
activating a childproofing function of the appliance by placement of a predetermined finger of an authorized user and not running through appliance menus.

18. The method according to claim 17, which further comprises deactivating the childproofing function by reapplication of the predetermined finger of the authorized user and not running through the appliance menus.

19. A method for inputting control information into a household appliance, which comprises:
performing a biometric fingerprint recognition of a respective user with a biometric fingerprint recognition device of a household appliance;
assigning the user to one of several authorization levels based on the biometric fingerprint recognition;
enabling at least one of a predetermined minimum range of functions and a predetermined minimum range of setting options of the appliance when at least one of a biometric recognition failure occurs and operation by an unknown user occurs; and centrally monitoring at least one of: control information entry; and at least one of the control and monitoring of appliances, at a location in a networked household.

20. The method according to claim 19, which further comprises at least one of storing and editing information selected from the group consisting of cost data, usage information, and consumption information at the appliance.

21. The method according to claim 20, which further comprises at least one of storing and editing information selected from the group consisting of cost data, usage information, and consumption information at the appliance in a central device.

22. The method according to claim 20, which further comprises at least one of storing and editing the information in a multi-dimensional user memory.

23. The method according to claim 20, which further comprises outputting the information as at least one of optical and acoustical information one of during and after recognition of the user.

24. The method according to claim 23, which further comprises outputting the information over a local network.

25. The method according to claim 24, which further comprises at least one of reading the user memory, editing the memory, and processing the information as data by an external service provider one of across an interface at the appliance, over a local network, and over a data line.

* * * * *